United States Patent
Prellwitz

(10) Patent No.: US 8,540,249 B2
(45) Date of Patent: Sep. 24, 2013

(54) MONITORING OF A SEALING ARRANGEMENT, PARTICULARLY OF A GAS COMPRESSOR OR GAS EXPANDER

(75) Inventor: Edgar Prellwitz, Muelheim (DE)

(73) Assignee: MAN Diesel & Turbo SE, Augsburg (DE)

( * ) Notice: Subject to any disclaimer, the term of this patent is extended or adjusted under 35 U.S.C. 154(b) by 817 days.

(21) Appl. No.: 12/641,504

(22) Filed: Dec. 18, 2009

(65) Prior Publication Data

US 2010/0171269 A1    Jul. 8, 2010

(30) Foreign Application Priority Data

Jan. 8, 2009    (DE) .......................... 10 2009 004 035

(51) Int. Cl.
*F16J 15/00*    (2006.01)

(52) U.S. Cl.
USPC ............................ 277/321; 277/317; 277/358

(58) Field of Classification Search
USPC ......................... 277/317–321, 358
See application file for complete search history.

(56) References Cited

U.S. PATENT DOCUMENTS

| 4,643,437 | A | * | 2/1987 | Salant et al. | .................. | 277/319 |
| 4,691,276 | A | * | 9/1987 | Miller et al. | .................... | 700/47 |
| 7,086,275 | B2 | | 8/2006 | Bock | | |

FOREIGN PATENT DOCUMENTS

| DE | 197 23 327 | | 12/1998 |
| DE | 103 14 924 | | 11/2004 |
| EP | 185134 A1 | * | 6/1986 |
| JP | 02176270 A | * | 7/1990 |
| WO | WO 2007/144187 a1 | * | 12/2007 |

* cited by examiner

*Primary Examiner* — Gilbert Lee
(74) *Attorney, Agent, or Firm* — Cozen O'Connor

(57) ABSTRACT

To monitor a sealing arrangement for sealing a shaft relative to a stationary part having a shaft sealing ring with a shaft conductor surface arrangement, a stator sealing ring with a stator conductor surface arrangement that is insulated from the shaft conductor surface arrangement, and a capacitive measuring arrangement, the stator conductor surface arrangement has a first stator conductor surface and at least a second stator conductor surface that is electrically insulated from the latter, and the shaft conductor surface arrangement has at least one shaft conductor surface, and the measuring arrangement has a device for detecting an electric capacitance between two stator conductor surfaces of the stator conductor surface arrangement, the electric capacitance between two stator conductor surfaces of the stator conductor surface arrangement is detected during operation.

13 Claims, 1 Drawing Sheet

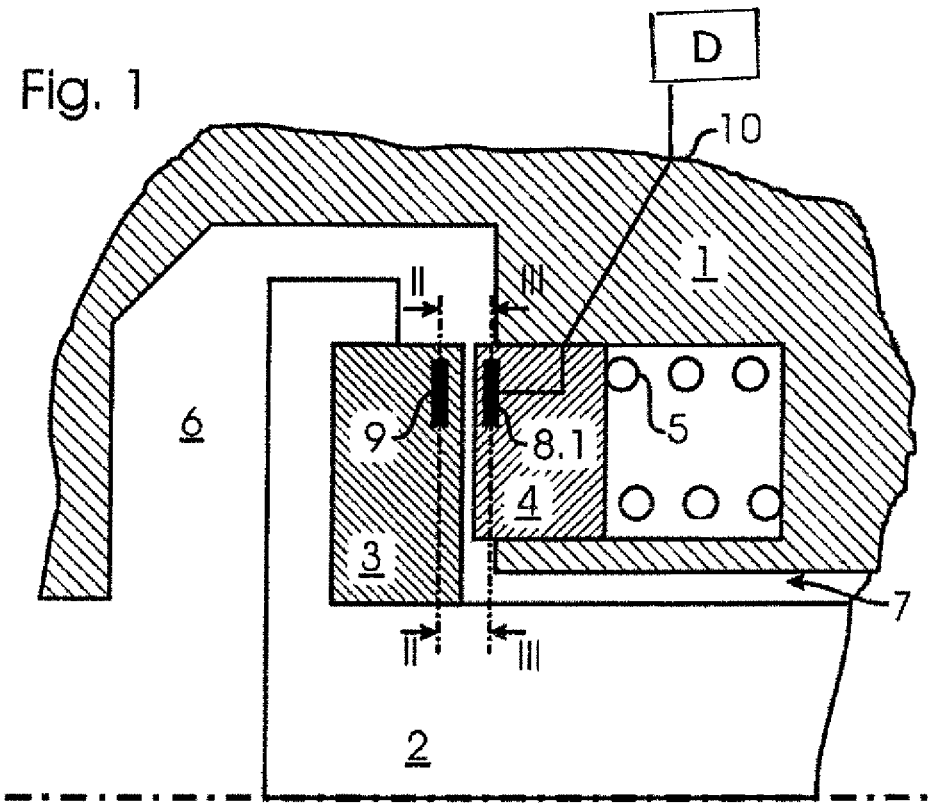
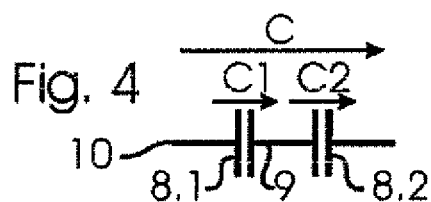
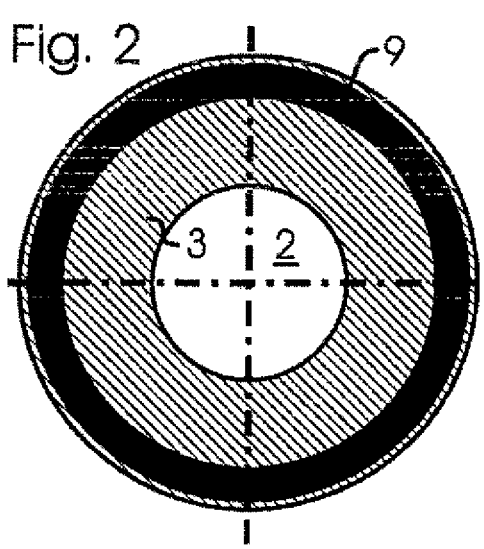
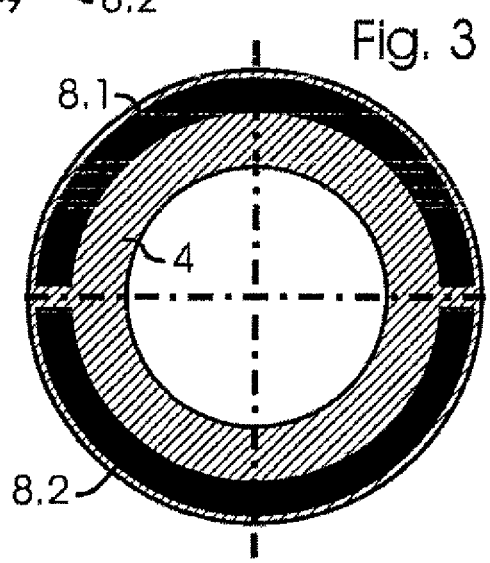

MONITORING OF A SEALING ARRANGEMENT, PARTICULARLY OF A GAS COMPRESSOR OR GAS EXPANDER

BACKGROUND OF THE INVENTION

1. Field of the Invention

The invention is directed to a monitorable sealing arrangement for sealing a shaft relative to a stationary part, having a shaft sealing ring, a stator sealing ring, and a capacitive measuring arrangement, to a method for monitoring a sealing arrangement of this kind, and to a flow machine, particularly a gas compressor or gas expander with a sealing arrangement of this kind.

2. Description of the Related Art

In turbine flow engines or turbine flow machines, particularly gas compressors and gas expanders, one or more shafts that rotate during operation must be sealed relative to a stationary part such as a housing to seal off a high-pressure volume from a low-pressure volume. For this purpose, sliding seals are known in which a sealing gap is formed between a moving shaft sealing ring and a stator sealing ring. Work medium flows continuously through this sealing gap so that a thin gas film in the sealing gap seals off the high-pressure volume from the low-pressure volume.

For monitoring a sealing arrangement of this kind, U.S. Pat. No. 4,643,437 proposes arranging a thermal element in the stator ring to detect the width of the sealing gap.

For fluid seals in which a lubricating film is formed in the sealing gap, DE 197 23 327 A1 suggests, among others, a capacitive measuring arrangement in which a sensor in each of a shaft sealing ring and a stator sealing ring form a respective plate electrode of a plate capacitor. It is disadvantageous that this solution for fluid seals requires a measurement tap at the rotating shaft sealing ring.

DE 103 14 924 B1 proposes a gas seal or fluid seal having a depot for receiving leakage whose width is detected by a plate capacitor formed in a stator ring on both sides of the width to be detected. A sealing gap between a moving shaft sealing ring and a stator sealing ring is not provided.

SUMMARY OF THE INVENTION

It is an object of the present invention to improve the monitoring of a sealing arrangement of the type mentioned above.

A sealing arrangement according to one embodiment of the invention for sealing a shaft, particularly of a rotor of a flow machine, relative to a stationary part such as a housing, bearing, or the like, comprises a shaft sealing ring and a stator sealing ring.

The shaft sealing ring can be connected to the shaft fixed with respect to rotation and fixed axially. In one embodiment, the shaft sealing ring can be formed integrally with the shaft as a shaft collar, detachably connected, e.g., screwed, to the shaft, or permanently connected to the shaft, e.g., by gluing. The stator sealing ring can also be connected to the stationary part fixed with respect to rotation and fixed axially. For example, it can be formed integrally therewith as a shoulder, detachably connected, e.g., screwed, to the part, or permanently connected to the part, e.g., by gluing.

Similarly, the shaft sealing ring and/or stator sealing ring can be fastened to the shaft fixed with respect to rotation but movable axially, for example, guided by means of a key, spline shaft, or the like, and then preferably preloaded hydraulically, pneumatically or by a spring device, relative to the other shaft sealing ring and stator sealing ring so that the sealing gap is under an equilibrium of forces between the gas film flowing through it and the preloading. In a preferred further development, the sealing gap can be actively regulated depending on a width of the sealing gap which is detected according to the invention in that, for example, the shaft sealing ring and/or stator sealing ring are adjusted toward the other shaft sealing ring and stator sealing ring by means of an actuator as is described in the above-cited U.S. Pat. No. 4,643,437 whose disclosure is referred to in this respect.

Finally, the shaft sealing ring and/or stator sealing ring can also be guided to be rotatable and axially movable. For example, a rotatable and axially movable shaft sealing ring can be arranged between a shaft collar and an axially preloaded stator sealing ring and can be clamped by the latter against the shaft collar.

A shaft conductor surface arrangement having one or more shaft conductor surfaces serving as capacitor electrodes is arranged at, or preferably inside, the shaft sealing ring. A stator conductor surface arrangement having a first stator conductor surface and a second stator conductor surface that is electrically insulated from the latter is arranged at, or preferably inside, the stator sealing ring, the first and second stator conductor surfaces are electrically insulated from the shaft conductor surface arrangement and likewise serve as capacitor electrodes. In the present case, electrically conductive surfaces made, for example, of metal, carbon, or the like, are referred to as conductor surfaces.

An electric capacitance between at least two stator conductor surfaces of the stator conductor surface arrangement can be detected by a capacitive measuring arrangement. Accordingly, the first stator conductor surface and the shaft conductor surface, which is electrically insulated from it, form a first capacitor. The shaft conductor surface and the second stator conductor surface, which is electrically insulated from both, forms a second capacitor which is connected in series with the first capacitor so that the first stator conductor surface and the second stator conductor surface form terminals of the series circuit that can be tapped in a simple manner. When the width of the sealing gap and, therefore, the axial distance between the shaft sealing ring and the stator sealing rig changes, the distance between the first stator conductor surface and the shaft conductor surface and between the shaft conductor surface and the second stator conductor surface also changes. Accordingly, the capacitance of the first capacitor and second capacitor and, therefore, the capacitance of the series circuit that can be tapped at the terminals changes too. In an advantageous manner, a change in distance causes a change in capacitance in both capacitors in the same direction. Therefore, a widening of the sealing gap as well as breakage of the shaft sealing ring or stator sealing ring and, therefore, an impairment of the seal can be detected based on a decrease in the detected capacitance of the series circuit.

In a preferred construction of the present invention, two or more conductor surfaces of the stator conductor surface arrangement and/or the shaft conductor surface arrangement complement one another to substantially form a circular ring. Accordingly, the seal can be detected substantially over the entire circumference of the shaft. Further, circular segment-shaped conductor surfaces of this kind can be produced in a simple manner in that a complete circular ring is interrupted by two or more insulating webs. Further, conductor surface arrangements of this kind comprising circular segment-shaped conductor surfaces require little radial installation space.

In addition or alternatively, two conductor surfaces of the stator conductor surface arrangement and/or shaft conductor surface arrangement can also be arranged concentric to one another or to the axis of rotation of the shaft. In this way also, the sealing can be detected substantially over the entire circumference of the shaft.

A conductor surface arrangement can be arranged on, particularly vacuum deposited on, the sliding surface of one sealing ring facing the other sealing ring as a thin metal film. In order not to impair the sealing of the sliding surfaces, the conductor surface arrangement can also be arranged substantially level with the sliding surface in that, for example, a metal film is arranged in a groove and then preferably subjected to cutting machining ground, lapped and/or polished along with the rest of the sliding surface. To achieve a homogeneous sliding surface in particular and to protect the conductor surface arrangement against mechanical damage, it is particularly preferable to arrange this conductor surface arrangement under the sliding surface of the corresponding sealing ring. For this purpose, for example, a corresponding metal ring or segments thereof can be cast together with a preferably sintered base body or subsequently either inserted into corresponding recesses from the end side opposite the sliding surface or inserted from the sliding surface into recesses which are subsequently closed. A base body of this kind is preferably produced from a non-conductive material, for example, silicon carbide, in order to electrically insulate the individual conductor surfaces of the respective conductor surface arrangement from one another.

A sealing arrangement according to the invention is particularly suitable for sealing a rotor of a gas compressor or gas expander in which it is particularly important to monitor the seal because of the sealing gap through which gas, which is partially under high pressure, flows continuously, but in which a tap at a rotating sealing ring is problematic owing to speeds which are sometimes high.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further advantages and features are indicated in the dependent claims and the embodiment example. In the drawings:

FIG. 1 is part of a gas expander with a sealing arrangement according to an embodiment of the present invention in longitudinal section;

FIG. 2 is a shaft sealing ring in cross section along line II-II in FIG. 1;

FIG. 3 is a stator sealing ring in cross section along line III-III in FIG. 1; and FIG. 4 is an electric equivalent circuit diagram of the capacitors that are connected in series and are formed by the conductor surface arrangements in the shaft sealing ring and stator sealing ring.

DETAILED DESCRIPTION OF THE PRESENTLY PREFERRED EMBODIMENTS

FIG. 1 is a longitudinal section through a portion of a housing 1 of a gas compressor in which a shaft in the form of a rotor 2 is received in a rotatable manner. A sealing arrangement according to the invention seals a high-pressure volume 6 in the interior of the gas compressor against a low-pressure volume 7. For this purpose, a thin sealing gap through which a thin gas film flows continuously during operation is formed between the sliding surfaces of a shaft sealing ring 3 and a stator sealing ring 4 that face one another. The sealing gap acts as a throttle and accordingly prevents a significant pressure loss in the high-pressure volume 6.

The shaft sealing ring 3 is received in a shaft collar of the rotor 2 and is screwed together (not shown) with the latter so that it is connected to the rotor 2 in such a way that it is fixed with respect to rotation and fixed axially and rotates together with it relative to the housing 1.

The stator sealing ring 4 is guided in a circular ring-shaped groove of the housing 1 so as to be displaceable axially and so as to be fixed with respect to rotation relative to it. It is preloaded against the shaft sealing ring 3 by a spring 5 so that the sealing gap adjusts to a predefined width in operation under the equilibrium of forces of the gas film flowing through it and of the spring 5.

To monitor the width of the sealing gap, i.e., the axial distance between the sliding surfaces of the shaft sealing ring 3 and stator sealing ring 4 facing one another, an annular shaft conductor surface 9 (see FIG. 2) is formed in the shaft sealing ring 3, and a stator conductor surface arrangement with a first stator conductor surface 8.1 and a second stator conductor surface 8.2 which is electrically insulated from the latter and which complements the first stator conductor surface 8.1 substantially so as to form a circular ring (see FIG. 3) in the stator sealing ring 4. The metal conductor surfaces 8.1, 8.2, 9 are preferably molded into the electrically insulating base body of the sealing rings 3, 4 when the latter are cast so that they are arranged below the sliding surfaces facing one another and are electrically insulated from one another.

The two stator conductor surfaces 8.1, 8.2 can be electrically tapped from the outside through a line 10 by an axial sliding contact to compensate for the axial movement of the stator sealing ring 4 so that a capacitance C between the first stator conductor surface 8.1 and second stator conductor surface 8.2 can be detected by a device D.

As can be seen particularly from the equivalent circuit diagram in FIG. 4, the first stator conductor surface 8.1 together with the shaft conductor surface 9 which faces it and which is electrically insulated from it forms a first capacitor C1 which is connected in series with a second capacitor C2 which is formed by the shaft conductor surface 9 and the second stator conductor surface 8.2 is located opposite to conductor surface 9 and which is electrically insulated from it. The capacitance of the two capacitors C1, C2 and therefore also the capacitance C of the series circuit which is tapped at the lines 10 between the two stator conductor surfaces 8.1, 8.2 decreases when the sealing gap increases or when there is a break in the sealing ring, so that the seal can be monitored based on this capacitance C.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A sealing arrangement for sealing a rotatable shaft relative to a stationary part, the sealing arrangement comprising:
a shaft sealing ring comprising:
a shaft conductor surface arrangement having at least one shaft conductor surface;
a stator sealing ring comprising:
a stator conductor surface arrangement insulated from the shaft conductor surface arrangement by a space, the stator conductor surface arrangement comprising at least:
a first stator conductor surface; and
a second stator conductor surface that is electrically insulated from the first stator conductor surface;
wherein the first and second stator conductor surfaces complement one another to form a substantially circular ring; and
a capacitive measuring device coupled to the stator conductor surface arrangement, the capacitive measuring device being configured to detect an electric capacitance between the first and second stator conductor surfaces of the shaft conductor surface.

2. The sealing arrangement according to claim 1, wherein the shaft conductor surface arrangement is embedded in and spaced from a sliding surface of the shaft sealing ring facing the stator sealing ring.

3. The sealing arrangement according to claim 1, wherein the stator conductor surface arrangement is embedded in and spaced from a sliding surface of the stator sealing ring facing the shaft sealing ring.

4. The sealing arrangement according to claim 1, wherein at least one of the shaft sealing ring and the stator sealing ring has a base body made of a non-conductive material.

5. The sealing arrangement according to claim 4, wherein the non-conductive material comprises silicon carbide.

6. The sealing arrangement according to claim 1, wherein the stator sealing ring is rotationally fixed and axially movable relative to the stationary part.

7. The sealing arrangement according to claim 1, wherein the shaft sealing ring is rotationally fixed and axially movable relative to the shaft.

8. The sealing arrangement according to claim 1, wherein the stator sealing ring is rotationally fixed and axially fixed relative to the stationary part.

9. The sealing arrangement according to claim 1, wherein the shaft sealing ring is rotationally fixed and axially fixed relative to the shaft.

10. A flow machine, comprising:
a housing;
a shaft arranged in the housing; and
a sealing arrangement for sealing the shaft relative to the housing, the sealing arrangement comprising:
a shaft sealing ring comprising:
a shaft conductor surface arrangement having at least one shaft conductor surface;
a stator sealing ring comprising:
a stator conductor surface arrangement insulated from the shaft conductor surface arrangement, the stator conductor surface arrangement having at least:
a first stator conductor surface; and
a second stator conductor surface that is electrically insulated from the first stator conductor surface;
wherein:
the first and second stator conductor surfaces complement one another to form a substantially circular ring; and
the shaft sealing ring and the stator sealing ring define a sealing gap through which work medium flows during operation;
the sealing arrangement further comprising a capacitive measuring device coupled to the stator conductor surface arrangement, the capacitive measuring device being configured to detect an electric capacitance between the first and second stator conductor surfaces of the shaft conductor surface.

11. The flow machine according to claim 10, wherein the flow machine is a gas compressor or a gas expander.

12. A method for monitoring a sealing arrangement for sealing a rotatable shaft relative to a stationary part, the sealing arrangement comprising a shaft sealing ring comprising a shaft conductor surface arrangement having at least one shaft conductor surface, a stator sealing ring comprising a stator conductor surface arrangement insulated from the shaft conductor surface arrangement by a space, the stator conductor surface arrangement comprising at least a first stator conductor surface and a second stator conductor surface that is electrically insulated from the first stator conductor surface, the method comprising:
detecting an electric capacitance between twe the first aand second stator conductor surfaces of the stator conductor surface arrangement during operation of the rotatable shaft, wherein the first and second stator conductor surfaces complement one another to form a substantially circular ring.

13. The method according to claim 12, further comprising detecting an impairment of the seal based on a decrease in the detected capacitance.

* * * * *